United States Patent
Faruque et al.

(10) Patent No.: US 12,552,341 B1
(45) Date of Patent: Feb. 17, 2026

(54) AIRBAG WITH VENTS HAVING DIFFERENT VENTING CHARACTERISTICS

(71) Applicant: Ford Global Technologies, LLC, Dearborn, MI (US)

(72) Inventors: Mohammad Omar Faruque, Ann Arbor, MI (US); S.M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/086,611

(22) Filed: Mar. 21, 2025

(51) Int. Cl.
B60R 21/239 (2006.01)

(52) U.S. Cl.
CPC .... B60R 21/239 (2013.01); *B60R 2021/2395* (2013.01)

(58) Field of Classification Search
CPC .............. B60R 21/203; B60R 21/239; B60R 2021/2395
See application file for complete search history.

(56) References Cited

U.S. PATENT DOCUMENTS

| | | | | |
|---|---|---|---|---|
| 3,573,885 A | * | 4/1971 | Brawn | B60R 21/239 280/739 |
| 5,478,111 A | * | 12/1995 | Marchant | B60R 21/239 280/739 |
| 5,492,363 A | * | 2/1996 | Hartmeyer | B60R 21/239 280/739 |
| 5,704,639 A | * | 1/1998 | Cundill | B60R 21/239 280/739 |
| 7,204,514 B2 | * | 4/2007 | Kanuma | B60R 21/231 280/743.1 |
| 7,431,334 B2 | | 10/2008 | Britz | |
| 7,810,840 B2 | | 10/2010 | Denys et al. | |
| 7,874,584 B2 | * | 1/2011 | Carvalho Marques | B60R 21/239 280/739 |
| 8,882,143 B2 | * | 11/2014 | Williams | D05B 13/00 280/739 |
| 8,888,128 B1 | * | 11/2014 | Seo | B60R 21/239 280/739 |
| 9,827,939 B1 | * | 11/2017 | Roychoudhury | B60R 21/233 |
| 10,093,270 B2 | * | 10/2018 | Hatfield | B60R 21/239 |

(Continued)

FOREIGN PATENT DOCUMENTS

| | | | | |
|---|---|---|---|---|
| EP | 0835787 A1 | * | 4/1998 | .......... B60R 21/239 |
| EP | 1575810 A1 | | 9/2005 | |

(Continued)

*Primary Examiner* — Laura Freedman
(74) *Attorney, Agent, or Firm* — Frank A. MacKenzie; Brooks Kushman P.C.

(57) ABSTRACT

An airbag includes a panel defining an inflation chamber. The airbag includes vents each including a vent opening and a vent cover. The airbag includes a first vent having a first vent opening extending through the panel to the inflation chamber. The airbag includes a second vent having a second vent opening spaced from the first vent opening and extending through the panel to the inflation chamber. The first vent includes a first vent cover covering the first vent opening and the second vent includes a second vent cover covering the second vent opening. The first vent cover has a first rupture strength and the second vent cover has a second rupture strength higher than the first rupture strength.

20 Claims, 7 Drawing Sheets

(56) References Cited

U.S. PATENT DOCUMENTS

| | | | |
|---|---|---|---|
| 11,292,416 B2 * | 4/2022 | Yamauchi | ............. B60R 21/203 |
| 2007/0246922 A1 | 10/2007 | Manssart | |
| 2009/0218797 A1 * | 9/2009 | Perez Garcia | ........ B60R 21/239 |
| | | | 280/742 |
| 2009/0267333 A1 | 10/2009 | Pittiglio et al. | |
| 2014/0375038 A1 | 12/2014 | Rovira Garcia | |
| 2025/0319838 A1 * | 10/2025 | Faruque | ................ B60R 21/239 |

FOREIGN PATENT DOCUMENTS

| | | |
|---|---|---|
| EP | 1314615 B1 | 11/2006 |
| KR | 20100031379 A | 3/2010 |

\* cited by examiner

AIRBAG WITH VENTS HAVING DIFFERENT VENTING CHARACTERISTICS

BACKGROUND

A vehicle may include one or more airbags deployable during certain vehicle impacts to control kinematics of occupants inside the vehicle. The airbag may be a component of an airbag assembly including a housing supporting the airbag, and an inflator in communication with the airbag for inflating the airbag from an uninflated position to an inflated position.

DETAILED DESCRIPTION

With reference to the Figures, wherein like numerals indicate like parts throughout the several views, an airbag 12 for a vehicle 10 includes a panel 14 defining an inflation chamber 16. The airbag 12 includes vents 18 each including a vent opening 20 and a vent cover 22. The airbag 12 includes a first vent 18 having a first vent opening 20 extending through the panel 14 to the inflation chamber 16. The airbag 12 includes a second vent 18 having a second vent opening 20 spaced from the first vent opening 20 and extending through the panel 14 to the inflation chamber 16. The first vent 18 includes a first vent cover 22 covering the first vent opening 20 and the second vent 18 includes a second vent cover 22 covering the second vent opening 20. The first vent cover 22 has a first rupture strength and the second vent cover 22 has a second rupture strength higher than the first rupture strength. The numerical adjectives such as "first," "second," etc., are used herein, including with reference to the vents 18 and rupture strengths, as identifiers and do not signify importance or order. The airbag 12 is inflatable from an uninflated position to an inflated position in response to detection of certain vehicle impacts to control the kinematics of an occupant of the vehicle 10. The rupture of the vent cover 22 allows for venting of inflation medium from the inflation chamber 16 to control the pressure in the inflation chamber 16 and the impact absorbing characteristics of the airbag 12. Since the vent covers 22 have different rupture strengths, the vents 18 provide various levels of venting based on the pressure in the inflation chamber 16, which may vary based on magnitude and/or direction of vehicle impact and size of the occupant when the airbag 12 is inflated. In the example set forth above, in the event pressure in the inflation chamber 16 exerts force on the first vent cover 22 and the second vent cover 22 below the first rupture strength, neither the first vent cover 22 nor the second vent cover 22 ruptures. In the event pressure in the inflation chamber 16 exerts force on the first vent cover 22 and the second vent cover 22 above the first rupture strength and below the first rupture strength, the first vent cover 22 ruptures to vent pressure from the inflation chamber 16 through the first vent opening 20 and the second vent cover 22 does not rupture. In the event pressure in the inflation chamber 16 exerts force on the first vent cover 22 and the second vent cover 22 above the second rupture strength, the first vent cover 22 and the second vent cover 22 rupture to vent pressure from the inflation chamber 16 through the first vent opening 20 and the second vent opening 20. In such an example, the rupture may be sequential with the first vent cover 22 rupturing before the second vent cover 22. In the event the first vent cover 22 ruptures and vents 18 pressure such that the pressure in the inflation chamber 16 does not reach a level that exerts force on the second vent cover 22 above the second rupture strength, the second vent cover 22 does not rupture.

In FIGS. 2-4 and 7, reference numeral 18 is supplemented with identifiers a, b, and c to distinguish between vents 18 with different venting characteristics. In the example shown in FIGS. 2-4, the airbag 12 includes two vents 18a having a first rupture strength and two vents 18b including a second rupture strength greater than the first rupture strength. In some examples, including the examples shown in the Figures, the airbag 12 includes clusters 24 of vents 18. In such examples, the clusters 24 of vents 18 can each include vents 18 that have the different venting characteristics, and each cluster 24 can include one or more vents 18 that have the same venting characteristics as vents 18 in each other cluster 24. In some examples, each cluster 24 may include the same number of vents 18 with the same variation in venting characteristics. In the example shown in FIG. 7, the airbag 12 includes four clusters 24 of three vents 18 with each cluster 24 including one vent 18a with a first venting characteristic, one vent 18b with a second venting characteristic different than the first venting characteristic, and one vent 18c with a third venting characteristic different than the first venting characteristic and the second venting characteristic.

Figure 1:
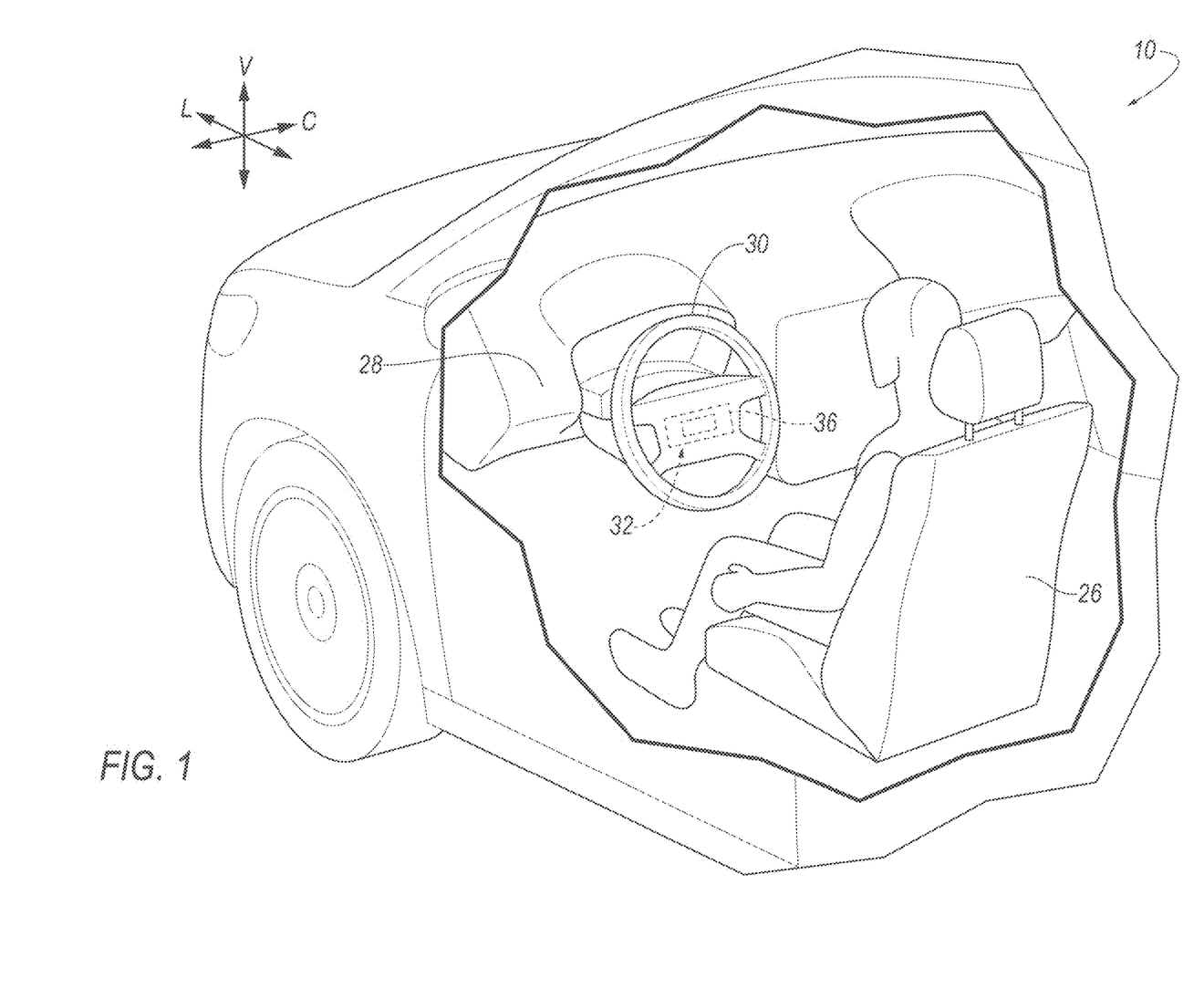
FIG. 1 is a cutaway view of a vehicle with an airbag in an uninflated position.

With reference to FIG. 1, the vehicle 10 may be any suitable type of automobile, e.g., a passenger or commercial automobile such as a sedan, a coupe, a truck, a sport utility, a crossover, a van, a minivan, a taxi, a bus, etc.

The vehicle 10 includes a vehicle body. The vehicle body may be of a unibody construction, a body-on-frame construction, or any suitable construction. In the unibody construction, the vehicle body serves as a frame, and the vehicle body (includes the rockers, pillars, roof rails, etc.) is unitary, i.e., a continuous one-piece unit. As another example, in body-on-frame construction (also referred to as a cab-on-frame construction), the vehicle body and frame are separate components, i.e., are modular, and the vehicle body is supported on and affixed to the frame. In other examples, the vehicle body may have any suitable construction. The vehicle body may be of any suitable material, for example, steel, aluminum, etc.

The vehicle body includes a vehicle roof, pillars, body panels, a vehicle floor, etc. The vehicle body defines a passenger compartment to house occupants of the vehicle 10. The passenger compartment may extend across the vehicle 10, i.e., from one side to the other side of the vehicle 10. The passenger compartment includes a front end and a rear end with the front end being in front of the rear end during forward movement of the vehicle 10.

With reference to FIG. 1, the vehicle 10 defines a vehicle-longitudinal axis L extending between a front end and a rear-end of the vehicle 10. The vehicle 10 defines a cross-vehicle axis C extending cross-vehicle from one side to the other side of the vehicle 10. The vehicle 10 defines a vertical axis V extending through a floor of the vehicle 10 and a roof of the vehicle 10. The vehicle-longitudinal axis L, the cross-vehicle axis C, and the vertical axis V are perpendicular relative to each other.

The vehicle roof and the vehicle floor are spaced from each other. Specifically, the vehicle floor is spaced below the vehicle roof. The vehicle roof defines the upper boundary of the passenger compartment and may extend from the front end of the passenger compartment to the rear end of the passenger compartment. The vehicle floor defines the lower boundary of the passenger compartment and may extend from the front end of the passenger compartment to the rear end of the passenger compartment.

The vehicle 10 may include one or more vehicle seats 26. Specifically, the vehicle 10 may include any suitable number of vehicle seats 26. The vehicle seats 26 are supported by the vehicle floor. The vehicle seats 26 may be arranged in any suitable arrangement in the passenger compartment. One or more of the vehicle seats 26 may be at the front end of the passenger compartment, e.g., front seats. The front seats may include a driver seat and a passenger seat. The driver seat is in position to position the occupant for operation of the steering wheel 30, e.g., at a front, left position of the passenger compartment in some examples. One or more of the vehicle seats 26 may be behind the front end of the passenger compartment, e.g., at the rear end of the passenger compartment as a rear row. The vehicle seats 26 may be of any suitable type, e.g., a bucket seat, bench seat, etc. The vehicle seats 26 may include seatbelts.

The airbag 12 is inflatable toward an adjacent one of the seats 26. In the example shown in the Figures, the airbag 12 is designed to inflate toward a driver seat to control the kinematics of an occupant of the driver seat during certain vehicle impacts. In other examples, the airbag 12 may be in other locations of the vehicle 10 to control the kinematics of other occupants of the vehicle 10.

Figure 2:
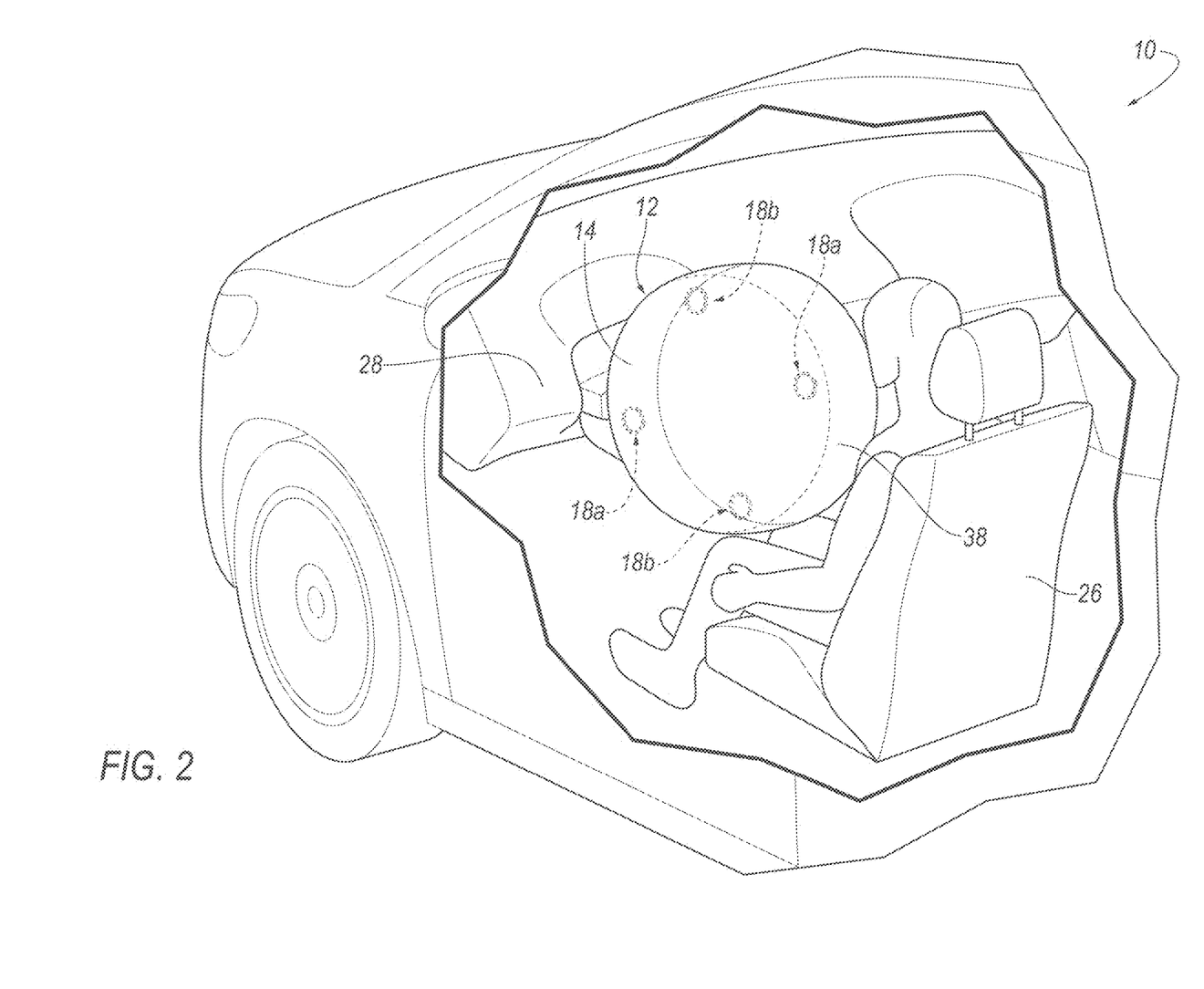
FIG. 2 is a perspective view of the vehicle with the airbag in an inflated position.
Figure 3:
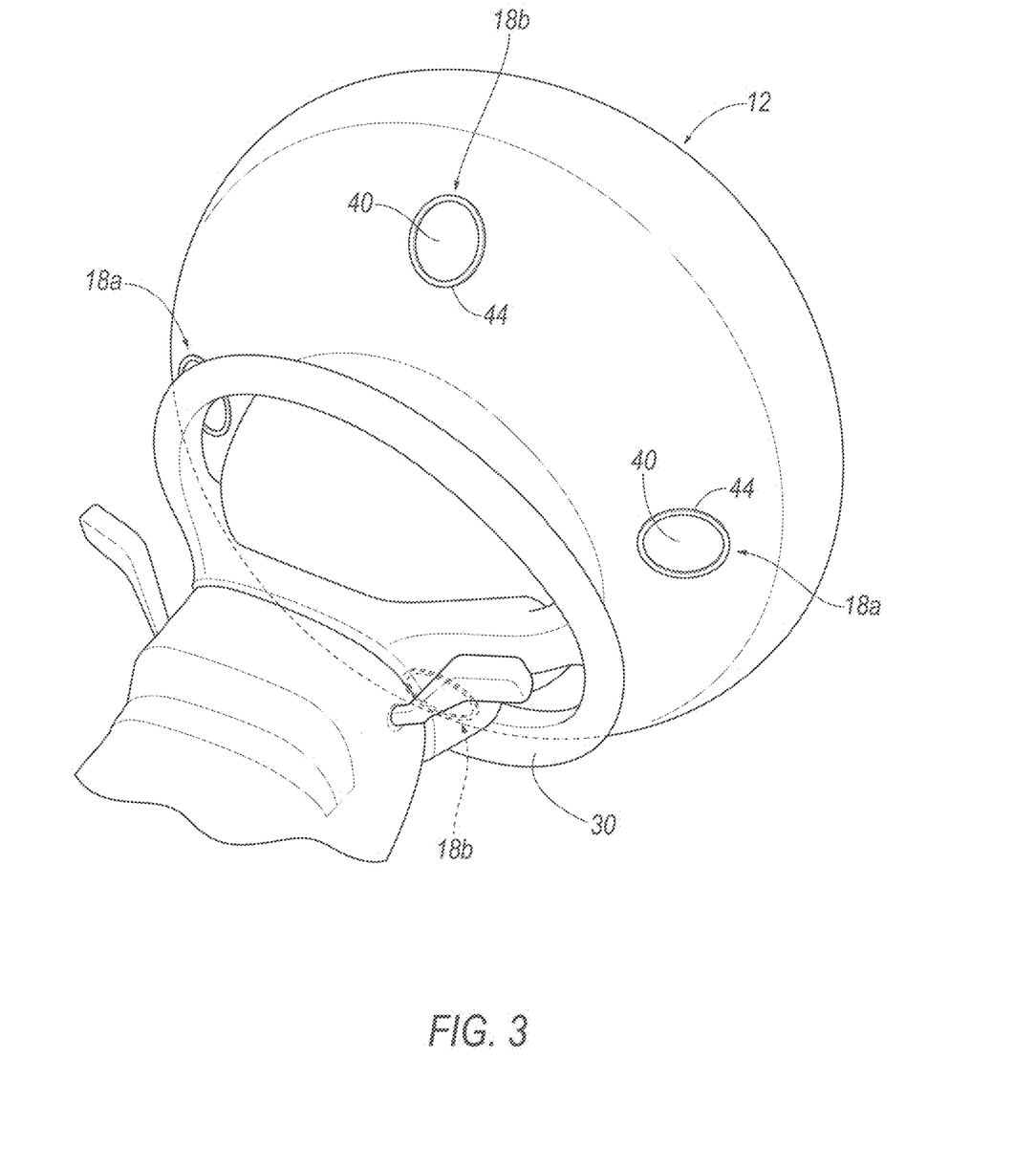
FIG. 3 is a perspective view of a portion of the vehicle with the airbag in the inflated position.
Figure 4:
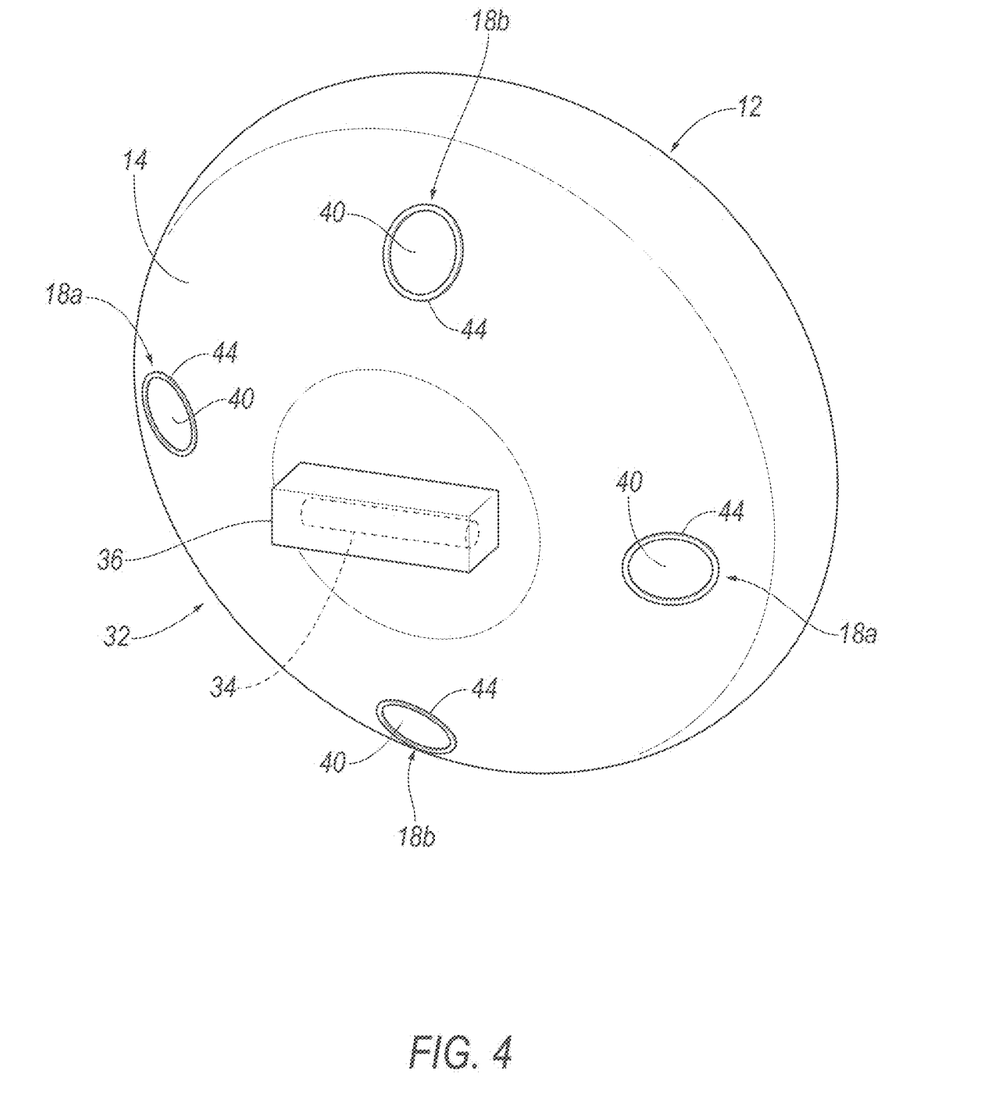
FIG. 4 is a perspective view of an airbag assembly in the inflated position.
Figure 5A:
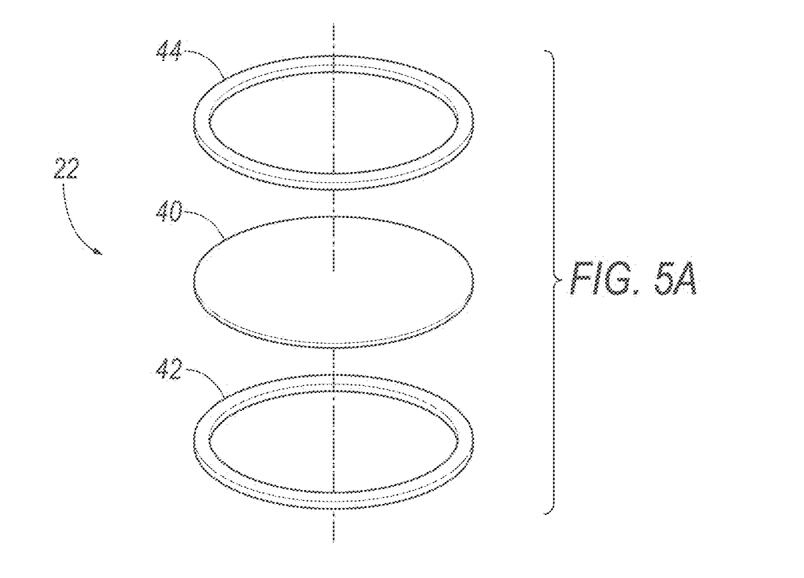
FIG. 5A is an exploded view of a vent cover.
Figure 5B:
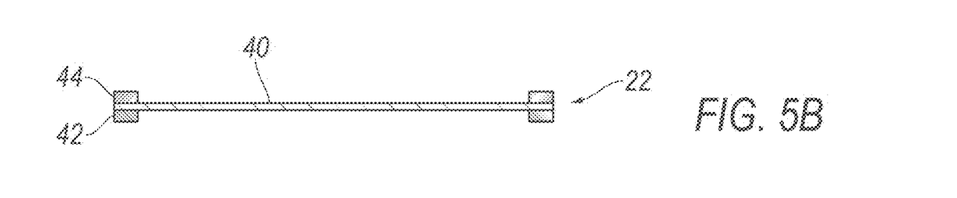
FIG. 5B is a cross-sectional view of the vent cover.
Figure 5C:
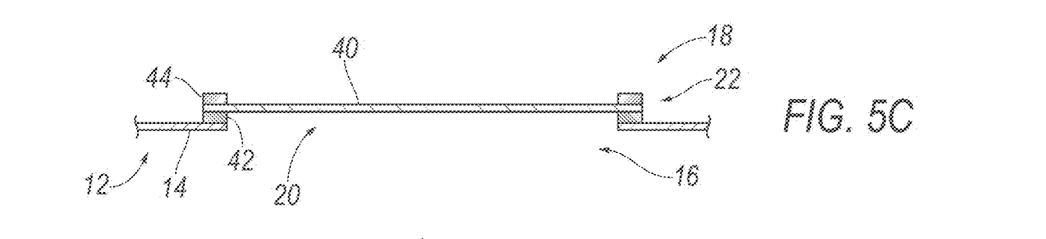
FIG. 5C is a cross-sectional view of the airbag including the vent cover of FIG. 5A.
Figure 5D:
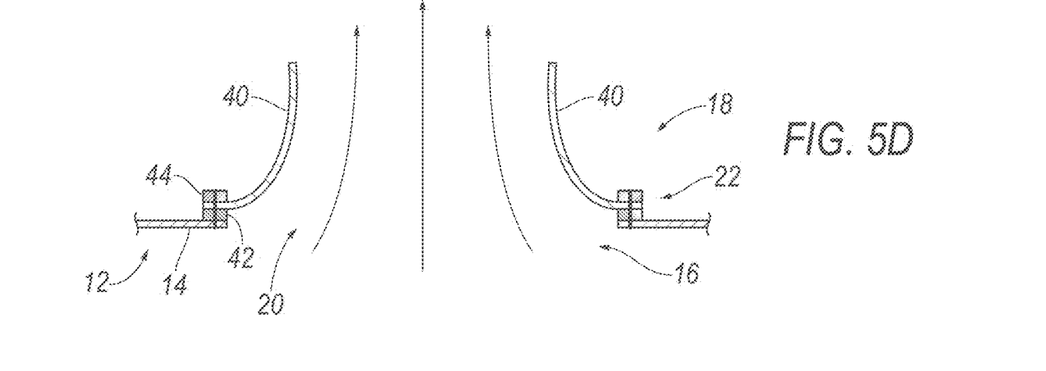
FIG. 5D is a cross-sectional view of the vent cover of FIG. 5C when the vent cover has ruptured.
Figure 6A:
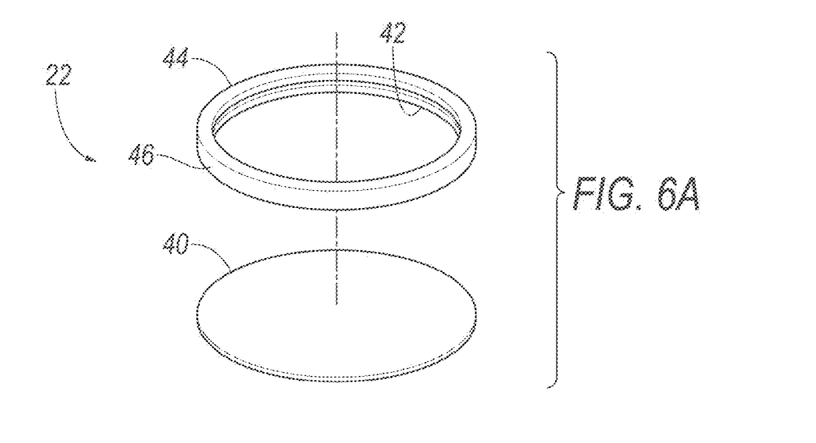
FIG. 6A is an exploded view of another example of the vent cover.
Figure 6B:
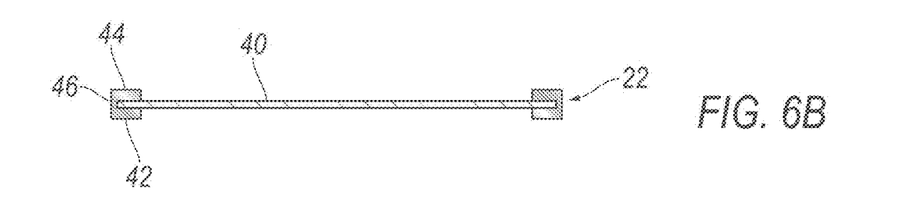
FIG. 6B is a cross-sectional view of the vent cover of FIG. 6A.
Figure 6C:
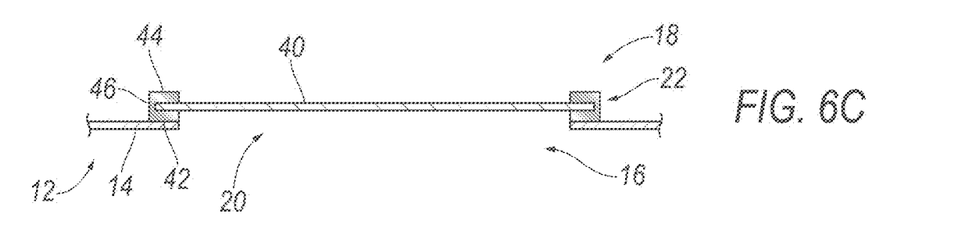
FIG. 6C is a cross-sectional view of the airbag including the vent cover of FIG. 6A.
Figure 6D:
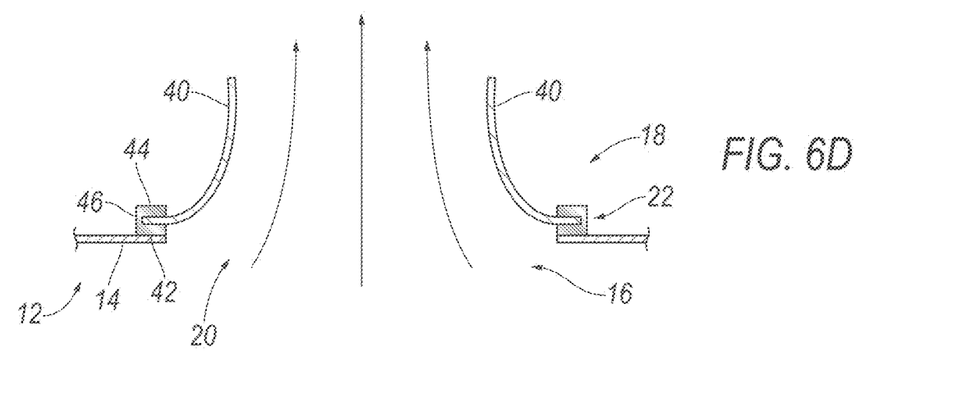
FIG. 6D is a cross-sectional view of the vent cover of FIG. 6C when the vent cover has ruptured.

With reference to FIGS. 1-3, the vehicle 10 includes at least one dash 28. In the example shown in the Figures, the dash 28 is at the front end of the passenger compartment and extends from one side of the vehicle 10 to the other side of the vehicle 10. As an example, the dash 28 may extend from one front pillar to another front pillar. The dash 28 may extend downwardly from a windshield. The dash 28 may also be called a bulkhead or an instrument panel. The dash 28 may support vehicle controls, including a steering wheel 30. As other examples, the dash 28 may include and/or support vehicle controls, such as gauges, dials, screens, and information displays; heating and ventilation equipment; a radio and other electronics; etc.

The vehicle 10 includes a steering system that controls the turning of wheels of the vehicle 10 on the ground. The steering system includes the steering wheel 30. Components of the steering system are in communication with and receive input from the steering wheel 30. The steering system may include a rack-and-pinion system with electric power-assisted steering, a steer-by-wire system, or any other suitable system, and in some examples, are of the type known in the art.

The steering system of the vehicle 10 includes a steering column and the steering wheel 30 may be supported by the steering column. The steering wheel 30 is in the passenger cabin and the steering column is at least partly in the passenger cabin. The steering wheel 30 receives rotational input from a human driver, i.e., a human driver seated in the driver seat 26, and the steering column transmits the rotation through other components of the steering system to the wheels of the vehicle 10. The airbag 12 may be supported by the steering wheel 30, as shown in the example in the Figures. As set forth above, in other examples the airbag 12 may be supported by other components of the vehicle 10.

The steering column is adjacent to the dash 28 and may be supported by the dash 28. The steering column may include at least one steering shaft that is fixed to the steering wheel 30 to transmit rotation of the steering wheel 30. The steering column includes a shroud that surrounds the steering shaft. The shroud has a class-A surface facing the passenger cabin, i.e., a finished surface exposed to view by a customer and free of unaesthetic blemishes and defects.

The vehicle 10 includes an airbag assembly 32 including the airbag 12 and an inflator 34. The airbag assembly 32 may be supported by the steering wheel 30 in the uninflated position and the inflated position. In other words, the weight of the airbag assembly 32 is borne by the steering wheel 30 in the uninflated position and in the inflated position. The airbag 12 may be inflatable from the steering wheel 30 toward the adjacent one of the seats 26 in a vehicle-rearward direction. When the airbag 12 is in the inflated position, the vents 18 may face away from respective occupant. In the example shown in the Figures, when the airbag 12 is in the inflated position, the vents 18 face in a vehicle-forward direction.

The airbag assembly 32 includes the airbag 12 and the inflator 34 and may include a housing 36. The inflator 34 inflates the airbag 12 to the inflated position, as described further below. In examples including the housing 36, the housing 36 houses the airbag 12 in the uninflated position and supports the airbag 12 in the inflated position. The airbag 12 may be rolled and/or folded to fit within the housing 36 in the uninflated position. The housing 36 may be of any suitable material, e.g., a rigid polymer, a metal, a composite, or a combination of rigid materials. In examples in which the airbag 12 is assembly is supported by the steering wheel 30, the airbag 12 housing 36 may be attached to the steering wheel 30. The airbag 12 housing 36 may, for example, include clips, threaded fasteners, etc., for attaching the housing 36 to the steering wheel 30.

The inflator 34 is in fluid communication with the airbag 12. The inflation chamber 16 is inflatable by the inflator 34 to the inflated position. The inflator 34 expands the airbag 12 with inflation medium, such as a gas, to move the airbag 12 from the uninflated position to the inflated position. The inflator 34 may be supported by any suitable component. For example, the inflator 34 may be supported by the housing 36. The inflator 34 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 34 may be, for example, at least partially in the inflation chamber 16 to deliver inflation medium directly to the inflation chamber 16 or may be connected to the inflation chamber 16 through fill tubes, diffusers, etc.

The airbag 12 includes the panel 14 and the vents 18. Each vent 18 includes a vent opening 20 in the panel 14 and a vent cover 22. The airbag 12 includes several vents 18 and, while some characteristics of the vents 18 may vary between the different vents 18, as described below, common numerals are used to identify common features of the multiple vents 18, and the identifiers a, b, and c following reference numeral 18 identify vents 18 having different venting characteristics. As set forth above, the numerical adjectives "first," "second," etc., are used herein, including with reference to the vents 18, as identifiers and do not signify importance or order.

The panel 14 defines the inflation chamber 16. The inflation chamber 16 is a void surrounded by the panel 14. The inflator 34 provides inflation medium to the inflation chamber 16 to pressurize the inflation chamber 16 and expand the panel 14 during inflation.

The panel 14 may be unitary, i.e., a single, uniform piece of material with no seams, joints, fasteners, or adhesives holding it together. In other examples, the panel 14 may include multiple segments formed separately and subsequently attached together at seams by, for example, stitching, welding, adhesive, etc.

The panel 14 may be a woven polymer yarn. The woven polymer yarn may be, for example, nylon 6, 6. Other examples of the woven polymer yarn include polyether ether ketone (PEEK), polyetherketoneketone (PEKK), polyester, etc. The woven polymer yarn may include a coating, such as silicone, neoprene, urethane, etc. For example, the coating may be polyorgano siloxane.

The vents 18 are spaced from each other. In other words, a portion of the panel 14 extends between adjacent vents 18. The panel 14 includes an impact surface 38 facing forward in the inflated position and the vents 18 are spaced from the impact surface 38 and face rearward away from the impact surface 38. In such an example, "forward" and "rearward" are with respect to the direction of movement of the airbag 12 during inflation. In the example shown in the Figures, the impact surface 38 faces vehicle-rearward and the vents 18 face vehicle-forward.

Each vent 18 is designed to restrict or prevent fluid flow from the inflation chamber 16 when the vent cover 22 is intact, i.e., not ruptured, and to allow fluid flow from the inflation chamber 16 to atmosphere when the vent cover 22 is ruptured. When the vent cover 22 is ruptured and the vent 18 vents 18 inflation medium from the inflation chamber 16, the venting relieves pressure in the inflation chamber 16 to decrease pressure in the inflation chamber 16 or lower an increase in pressure. In some examples, the vents 18 may be sealed to the inflation panel 14 endlessly around the vent opening 20 to prevent venting through the vent opening 20 from the inflation chamber 16 to the atmosphere exterior to the airbag 12 when the vent cover 22 is intact.

Each vent cover 22 includes a membrane 40, a first ring 42 on one side of the membrane 40, and a second ring 44 on another side of the membrane 40. The membrane 40 is sandwiched between the first ring 42 and the second ring 44. The first ring 42 and the second ring 44 are attached to the panel 14 around the respective vent opening 20. The first ring 42 may abut the panel 14 and the membrane 40 is suspended across the vent opening 20 by the first ring 42. The second ring 44 anchors the membrane 40 between the first ring 42 and the second ring 44 for attachment to the panel 14. The membrane 40 encloses the vent opening 20 when the membrane 40 is intact. The vent cover 22 may be on an interior side of the panel 14, i.e., in the inflation chamber 16, or may be on an exterior side of the panel 14 opposite the inflation chamber 16.

The first ring 42 and the second ring 44 are fixed to the membrane 40. As an example, the first ring 42 and the second ring 44 are adhered, bonded, welded, and/or stitched to the membrane 40. The first ring 42 and the second ring 44 abut the membrane 40 in the example shown in the Figures.

In the example shown in the Figures, the first ring 42 abuts the panel 14 and is fixed directly to the panel 14. As an example, the first ring 42 may be adhered, bonded, or welded to the panel 14. In addition or in the alternative, the first ring 42 may be stitched to the membrane 40. In such an example, stitching may extend through the first ring 42, the second ring 44, and the panel 14.

In some examples, the first ring 42 and the second ring 44 are fabric. As an example, the first ring 42 and the second ring 44 may be of the same type of material as the panel 14.

In some examples, the first ring 42 and the second ring 44 are separate and connected together through assembly to the membrane 40. In other examples, the vent cover 22 includes a circumferential ring 46 extending from the first ring 42 to the second ring 44. In such an example, the first ring 42, the second ring 44, and the circumferential ring 46 for a C-shape in cross-section. A gap between the first ring 42, the second ring 44, and the circumferential ring 46 receives the membrane 40.

In some examples, the membrane 40 is a solid material that is impermeable to gas flow when the membrane 40 is intact. In some examples, the membrane 40 is an impermeable sheet of material. In some examples, the membrane 40 is elastomeric. In such examples, the membrane 40 may be a solid elastomeric sheet, i.e., not woven fabric. In other examples, the membrane 40 is woven fabric, e.g., woven nylon yarn, woven polyether yarn, woven polyester yarn, etc.

Figure 7:
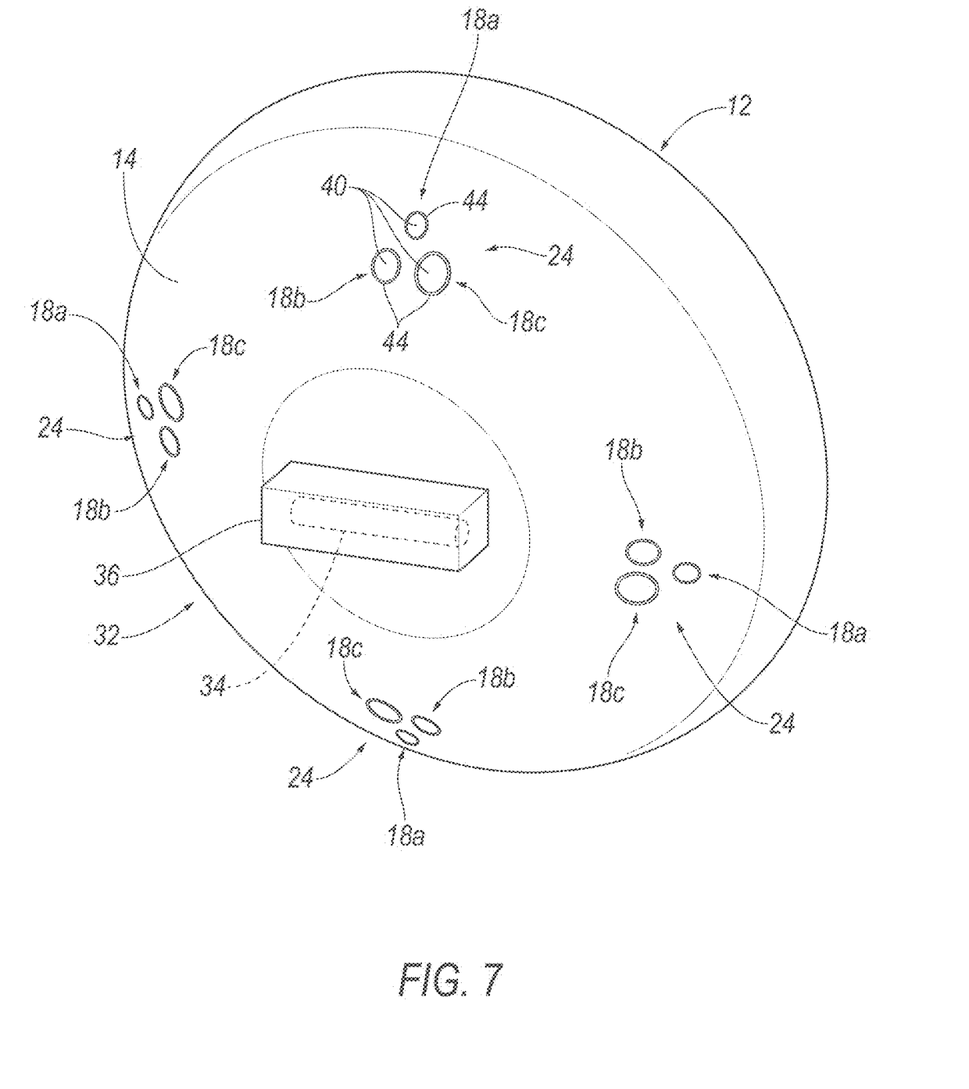
FIG. 7 is a perspective view of another airbag assembly.

In some examples, such as the example shown in FIG. 7, the airbag 12 includes clusters 24 of multiple vents 18. The airbag 12 may include any suitable number of clusters 24. In the example shown in the Figures, the airbag 12 includes four clusters 24 spaced from each other about the airbag 12. In some examples, such as the example shown in the Figures, the clusters 24 are equidistantly spaced from adjacent clusters 24.

The vents 18 are grouped together in clusters 24 with the clusters 24 being based on spacing of the vents 18 of one cluster 24 relative to vents 18 in other clusters 24. The vents 18 of each cluster 24 are spaced relatively close to each other in comparison to spacing from vents 18 in other clusters 24. For each cluster 24, the vents 18 of the cluster 24 are closer to each other than to the vents 18 of other clusters 24. For example, in an example in which the cluster 24 includes three vents 18 such as in the example in FIG. 7, each vent 18 is closer to the other two vents 18 of the cluster 24 than to a vent 18 in any other cluster 24.

In some examples, including the example shown in the Figures, the vents 18, and their respective vent covers 22, are spaced from each other circumferentially about the panel when the airbag 12 is in the inflated position. In the example shown in FIGS. 2-4, four vents 18 are equidistantly spaced from each other about the panel 14, e.g., a rear side of the panel 14, in the inflated position. In the example shown in FIG. 7, four clusters 24 are equidistantly spaced from each other about the panel 14, e.g., a rear side of the panel 14, in the inflated position.

For each cluster 24, at least some of the vents 18 in the cluster 24 may have different venting characteristic than other vents 18 in that cluster 24. For example, in the example shown in FIG. 7, vent 18a, vent 18b, and vent 18c each have different venting characteristics (and each vent 18a has the same venting characteristic as the other vents 18a, each vent 18b has the same venting characteristic as the other vents 18b, and each vent 18c has the same venting characteristic as the other vents 18c). At least some of the clusters 24 may include vents 18 that have the same venting characteristic as one or more vents 18 in another cluster 24. In some examples, each cluster 24 may include identical sets of vents 18. In such an example, the clusters 24 each have the same number of vents 18, at least some of the vents 18 of each cluster 24 have different venting characteristics, and each cluster 24 includes the same number of vents 18 with the same respective venting characteristics as each other cluster 24. As an example, in an example with four clusters 24 of three vents 18, as shown in the example in the Figures, each cluster 24 includes one vent 18a with a first venting characteristic, one vent 18b with a second venting characteristic, and one vent 18c with a third venting characteristic (with the first, second, and third venting characteristic being different). Specifically, in such an example, one cluster 24 may have a first vent 18a, a second vent 18b, and a fifth vent 18c; and another cluster 24 may have a third vent 18a, a fourth vent 18b, and a sixth vent 18c with the cover of the first vent 18a and the third vent 18a having a first rupture strength; the cover of the second vent 18b and the third vent 18b having a second rupture strength higher that the first rupture strength; and the cover of the fifth vent 18c and the sixth vent 18c having a third rupture strength higher than the second rupture strength.

The venting characteristic of a vent 18 includes the rupture strength at which the vent cover 22 ruptures and the size of the vent opening 20 when the vent cover 22 ruptures. The rupture strength controls the pressure in the inflation chamber 16 at which the vent cover 22 ruptures, and the size of the vent opening 20 controls the rate of pressure release from the inflation chamber 16 through the vent opening 20. The vents 18 are designed to have venting performance, i.e., pressure release at a given rate in response to a given pressure in the inflation medium. The venting performance is based on the venting characteristics.

The rupture strength of the vent cover 22 may be based on the thickness of the vent cover 22, the diameter of the vent cover 22, and the material type of the vent cover 22. One vent cover 22 may have a higher rupture strength than another vent cover 22 by having a greater thickness and/or a material type that that has relatively higher rupture strength. In some examples, a vent cover 22 having a larger diameter may have a higher rupture strength than other vent covers 22 in examples in which all other variables of the vent covers 22 are the same. In some examples, a first vent cover 22 may have a first thickness and a second vent cover 22 may have a second thickness greater than the first thickness, in which case the second vent cover 22 has a higher rupture strength in examples in which all other variables of the two vent covers 22 are equivalent. As another example, a first vent cover 22 may have a first diameter and a second vent cover 22 may have a second diameter greater than the first diameter, in which case the second vent cover 22 has a lower rupture strength in examples in which all other variables of the two vent covers 22 are equivalent. As another example, a first vent cover 22 may be of a first material type and a second vent cover 22 may be of a second material type having a higher rupture strength than the first material type, in which case the second vent cover 22 has a higher rupture strength in examples in which all other variables of the vent covers 22 are equivalent. As an example, the different material types may be materials of different chemical compositions, e.g., silicone, polyurethane, nylon, polyester, etc.

The vehicle 10 includes a computer, a network, and various sensors, including an impact sensor. The computer includes a processor and a memory. The memory includes one or more forms of computer readable media, and stores instructions executable by the computer for performing various operations, including as disclosed herein. For example, the computer may be a restraints control module (RCM). The computer is generally arranged for communications on a vehicle communication network that can include a bus in the vehicle such as a controller area network CAN or the like, and/or other wired and/or wireless mechanisms. Alternatively or additionally, in cases where the computer actually comprises a plurality of devices, the vehicle communication network may be used for communications between devices represented as the computer in this disclosure. Further, as mentioned below, various controllers and/or sensors may provide data to the computer via the vehicle communication network.

The vehicle 10 may include at least one impact sensor for sensing certain vehicle impacts (e.g., impacts of a certain magnitude, direction, etc.). The vehicle computer may activate the inflator 34, e.g., provide an impulse to a pyrotechnic charge of the inflator 34, when the impact sensor senses certain vehicle impacts. Alternatively or additionally to sensing certain vehicle impacts, the impact sensor may be configured to sense certain vehicle impacts prior to impact, i.e., pre-impact sensing. The impact sensor is configured to detect certain vehicle impacts. In other words, a "certain vehicle impact" is an impact of the type and/or magnitude for which activation of the airbag assembly 32 is designed i.e., "certain" indicates the type and/or magnitude of the impact. The type and/or magnitude of such "certain vehicle impacts" may be pre-stored in the computer, e.g., a restraints control module and/or a body control module. The impact sensor may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor may be located at numerous points in or on the vehicle 10.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag, comprising:
   a panel defining an inflation chamber;
   a first vent opening extending through the panel to the inflation chamber;
   a second vent opening spaced from the first vent opening and extending through the panel to the inflation chamber; and
   a first vent cover covering the first vent opening and a second vent cover covering the second vent opening, the first vent cover having a first rupture strength and the second vent cover having a second rupture strength higher than the first rupture strength.

2. The airbag as set forth in claim 1, wherein the first vent cover has a first thickness and the second vent cover has a second thickness greater than the first thickness.

3. The airbag as set forth in claim 2, wherein the first vent opening has a first diameter and the second vent opening has a second diameter greater than the first diameter.

4. The airbag as set forth in claim 1, wherein the first vent opening has a first diameter and the second vent opening has a second diameter greater than the first diameter.

5. The airbag as set forth in claim 1, wherein the first vent cover is a first material type and the second vent cover is a second material type, the second material type having a higher rupture strength than the first material type.

6. The airbag as set forth in claim 1, wherein the first vent cover and the second vent cover each include a membrane, a first ring on one side of the membrane, and a second ring on another side of the membrane.

7. The airbag as set forth in claim 6, wherein the first rings and the second rings are fabric.

8. The airbag as set forth in claim 7, wherein, for both the first vent cover and the second vent cover, the first ring and the second ring are adhered to the membrane.

9. The airbag as set forth in claim 6, wherein:
the first ring of the first vent cover is fixed directly to the panel and the membrane of the first vent cover is suspended across the first vent opening by the first ring of the first vent cover; and
the first ring of the second vent cover is fixed directly to the panel and the membrane of the second vent cover is suspended across the second vent opening by the first ring of the second vent cover.

10. The airbag as set forth in claim 6, wherein:
the first vent cover includes a circumferential ring extending from the first ring of the first vent cover to the second ring of the first vent cover; and
the second vent cover includes a circumferential ring extending from the first ring of the second vent cover to the second ring of the second vent cover.

11. The airbag as set forth in claim 6, wherein the membranes are elastomeric.

12. The airbag as set forth in claim 6, wherein the first rings and the second rings are fabric, the membranes are solid elastomer.

13. The airbag as set forth in claim 1, further comprising:
a third vent opening extending through the panel to the inflation chamber;
a fourth vent opening extending through the panel to the inflation chamber; and
a third vent cover covering the third vent opening and a fourth vent cover covering the fourth vent opening, the third vent cover having the first rupture strength and the fourth vent cover having the second rupture strength.

14. The airbag as set forth in claim 13, wherein the first opening cover and the second vent opening are clustered together, and the third vent opening and the fourth vent opening are clustered together.

15. The airbag as set forth in claim 14, wherein the inflation chamber is inflatable to an inflated position, the first vent cover, the second vent cover, the third vent cover, and the fourth vent cover being spaced circumferentially about the panel in the inflated position.

16. The airbag as set forth in claim 14, further comprising:
a fifth vent opening extending through the panel to the inflation chamber;
a sixth vent opening extending through the panel to the inflation chamber; and
a fifth vent cover covering the fifth vent opening and a sixth vent cover covering the sixth vent opening, the fifth vent cover and the sixth vent cover each having a third rupture strength higher than the first rupture strength and the second rupture strength.

17. The airbag as set forth in claim 16, wherein the first vent opening, the second vent opening, and the fifth vent opening are clustered together, and the third vent opening, the fourth vent opening, and the sixth vent opening are clustered together.

18. The airbag as set forth in claim 1, wherein the inflation chamber is inflatable to an inflated position, the panel including an impact surface facing forward in the inflated position, and the first vent opening and the second vent opening are spaced from the impact surface and face rearward away from the impact surface.

19. An airbag, comprising:
a panel defining an inflation chamber; and
a first cluster of vents and a second cluster of vents;
the first cluster of vents including a first vent including a first vent opening extending through the panel to the inflation chamber and a first vent cover covering the first vent opening;
the first cluster of vents including a second vent including a second vent opening extending through the panel to the inflation chamber and a second vent cover covering the second vent opening;
the second cluster of vents including a third vent including a third vent opening extending through the panel to the inflation chamber and a third vent cover covering the third vent opening; the second cluster of vents including a fourth vent including a fourth vent opening extending through the panel to the inflation chamber and a fourth vent cover covering the fourth vent opening;
the first vent cover and the third vent cover having a first rupture strength, and the second vent cover and the third vent cover having a second rupture strength higher than the first rupture strength;
each vent including a membrane, a first ring on one side of the membrane, and a second ring on another side of the membrane; and
for each vent, the first ring being fixed directly to the panel and the membrane being suspended across the respective vent opening by the first ring.

20. The airbag as set forth in claim 19, wherein:
the first vent cover and the third vent cover each have a first thickness and the second vent cover and the fourth vent cover each have a second thickness greater than the first thickness; and
the first vent opening and the third vent opening each have a first diameter and the second vent opening and the third vent opening each have a second diameter greater than the first diameter.

* * * * *